United States Patent
Lin

(10) Patent No.: US 11,567,731 B2
(45) Date of Patent: Jan. 31, 2023

(54) DEVICE FOR COMPUTING AN INNER PRODUCT

(71) Applicant: National Chung Cheng University, Chia-Yi (TW)

(72) Inventor: Tay-Jyi Lin, Chiayi County (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 371 days.

(21) Appl. No.: 16/998,724

(22) Filed: Aug. 20, 2020

(65) Prior Publication Data
US 2021/0357184 A1 Nov. 18, 2021

(30) Foreign Application Priority Data
May 13, 2020 (TW) ................. 109115842

(51) Int. Cl.
*G06F 7/544* (2006.01)
*G06F 16/22* (2019.01)
*G06N 3/04* (2006.01)

(52) U.S. Cl.
CPC ........ *G06F 7/5443* (2013.01); *G06F 16/2282* (2019.01); *G06N 3/04* (2013.01)

(58) Field of Classification Search
CPC ................................................ G06F 7/5443
See application file for complete search history.

(56) References Cited

U.S. PATENT DOCUMENTS 10,496,855 B2 * 12/2019 Muralimanohar ....... G06G 7/14
2018/0173677 A1 * 6/2018 Muralimanohar .... G06F 7/5443

\* cited by examiner

*Primary Examiner* — Michael D. Yaary
(74) *Attorney, Agent, or Firm* — Muncy, Geissler, Olds & Lowe, P.C.

(57) ABSTRACT

A device for computing an inner product includes an index unit, a storage operation unit, a redundant to 2's complement (RTC) converter, a mapping table, and a multiplier-accumulate (MAC) module. The index unit, storing index values, is coupled to word lines. The storage operation unit includes the word lines and bit lines and stores data values. The mapping table stores coefficients corresponding to the index values. The index unit enables the word line according to a count value and the index value, such that the storage operation unit accumulates the data values corresponding to the bit lines and the enabled word line, thereby generating accumulation results. The RTC converter converts the accumulation results into a total data value in 2's complement format. The MAC module operates based on the total data value and the coefficient to generate an inner product value.

10 Claims, 5 Drawing Sheets

DEVICE FOR COMPUTING AN INNER PRODUCT

This application claims priority for Taiwan patent application no. 109115842 filed on 13 May 2020, the content of which is incorporated by reference in its entirely.

BACKGROUND OF THE INVENTION

Field of the Invention

The present invention relates to a computing device, particularly to a device for computing an inner product.

Description of the Related Art

The inner product of vectors is one of the most important cores in massive inner product operations, such as signal processing and neural networks. This is because signal processing and neural networks use a lot of the same weights or coefficients. FIG. 1 is a schematic diagram illustrating a fully-connected neural network in the conventional technology. The neural network is composed of many neurons, each one of which is represented as one circle depicted in FIG. 1. The circles from left to right respectively represent neurons of an input layer, neurons of hidden layers, and neurons of an output layer. $x_{i,j}$ represents the j-th neuron of the i-th layer. FIG. 2 is a schematic diagram illustrating a device for computing an inner product applied to the neural network in the conventional technology. As illustrated in FIG. 2, the device for computing an inner product 50 includes a weight unit 52, a storage operation unit 54, a multiplier 56, an adder 58, and a function processor 60. The weight unit 52 and the storage operation unit 54 are coupled to the multiplier 56. The multiplier 56 is coupled to the adder 58. The adder 58 is coupled to the function processor 60. The weight unit 52 and the storage operation unit 54 respectively store weight data $w_{i,j,k}$ and inputted determined data $x_{i,j}$. In the device for computing an inner product 50, the j-th neuron $x_{i,j}$ of the i-th layer needs to compute the inner product of the output data of the k-th neuron $x_{i-1,k}$ of the (i-1)-th layer and the corresponding weight data $w_{i,j,k}$ and adds a bias $b_{i,j}$ corresponding to the j-th neuron of the i-th layer to obtain a result. The result is then processed by an activation function and described as follows: $x_{i,j} = \max[\Sigma_{k=0}^{N_{i-1}-1} w_{i,j,k} \cdot x_{i-1,k} + b_{i,j}, 0]$. $N_{i-1}$ represents the number of input data corresponding to neurons of the (i-1)-th layer.

As illustrated in FIG. 2, the inner product computation of vectors is directly implemented based on a multiplier-accumulator (MAC). The multiplier 56 multiplies elements corresponding to two vectors (e.g., the output data of all neurons $x_{i,j}$ of a previous layer of the neural network and the corresponding weight data $w_{i,j,k}$) to obtain products. Then, the adder 58 sequentially accumulates the products to obtain an inner product.

However, the abovementioned computation needs to perform multiplication and accumulation on each value of the input vector and the weights bit by bit. Thus, the computation amount is very large. The computation amount needs more memories to be performed, which consumes much time and more power.

FIG. 3 is a schematic diagram illustrating a device for computing an inner product in the conventional technology. The device for computing an inner product operates based on formula (1). $w_{i,j,k}$ represents the weight of the j-th neuron of the i-th layer connected to the k-th neuron of the (i-1) layer. $x_{i-1,k}$ represents the output data of the k-th neuron of the (i-1) layer. k represents the serial number of the neuron of the (i-1) layer. $N_{i-1}$ represents the total number of neurons of the (i-1) layer. As a result, the computation multiplies the output data of all neurons of the (i-1) layer by the corresponding weights to obtain results and accumulates these results. $W_m$ represents the representative weight of the serial number m. $\Sigma_{w_{i,j,k}=w_m} x_{i-1,k}$ represents the accumulation value of $x_{i-1,k}$ when $w_{i,j,k}$ is equal to $W_m$. m represents the serial number of the representative weight. K represents the total number of the representative weights. Accordingly, the representative weight can be multiplied by the corresponding accumulation value to obtain the same result. The device for computing an inner product includes an index unit 62, a storage operation unit 64, an accumulator 66, an adder 68, a mapping table 70, a multiplier 72, an adder 74, and a function processor 76. The device for computing an inner product uses the accumulator 66 and the adder 74 to perform accumulation. Although the device for computing an inner product reduces the computation amount based on the distributive law, the accumulator 66 and the adder 74 perform accumulation N times (N represents the number of values) and cooperate with the multiplier 72 to perform multiplication and accumulation on coefficients K times. As a result, the computation amount of the device for computing an inner product is not balanced, which easily causes low usage and waste of the operation architecture.

$$\Sigma_{k=0}^{N_{i-1}-1} W_{i,j,k} \cdot x_{i-1,k} = \Sigma_{m=0}^{K-1} W_m \cdot (\Sigma w_{i,j,k}=w_m x_{i-1,k}) \quad (1)$$

To overcome the abovementioned problems, the present invention provides a device for computing an inner product, so as to solve the afore-mentioned problems of the prior art.

SUMMARY OF THE INVENTION

The present invention provides a device for computing an inner product, which has the high usage of the hardware architecture and the small computation amount.

In an embodiment of the present invention, a device for computing an inner product is provided. The device for computing an inner product includes an index unit, a storage operation unit, a redundant to 2's complement (RTC) converter, a mapping table, and a multiplier-accumulate (MAC) module. The index unit is configured to store index values and coupled to word lines arranged in parallel. The word lines respectively correspond to the index values. The index unit is configured to sequentially receive count values. The index unit is configured to use the index value corresponding to each of the count values as a mapping value. The index unit is configured to sequentially send out the mapping value corresponding to each of the count values. The index unit is configured to enable the word line corresponding to the mapping value. The storage operation unit comprises memory cells, the word lines, and bit lines arranged in parallel. Each of the word lines is coupled to the bit lines through the memory cells. The memory cells are configured to respectively store data values. The data value comprises logic "1" or logic "0". The storage operation unit is configured to accumulate the data values corresponding to the bit lines and the enabled word line, thereby generating accumulation results that respectively correspond to the bit lines. The redundant to 2's complement (RTC) converter is coupled to the storage operation unit and configured to receive, shift and add the accumulation results to convert the accumulation results into a total data value in 2's complement format. The mapping table is coupled to the index unit. The mapping table is configured to store coefficients corresponding to the index values. The mapping table is configured to receive the mapping value. The mapping table is configured to send out the coefficient corresponding to the mapping value. The multiplier-accumulate (MAC) module is coupled to the redundant to 2's complement converter and the mapping table. The multiplier-accumulator module is configured to receive the total data value and the coefficient that correspond to each of the count values. The multiplier-accumulator module is configured to perform multiplication and accumulation on the total data value and the coefficient that correspond to each of the count values based on the distributive law, thereby generating an inner product value.

In an embodiment of the present invention, the device for computing an inner product further includes an index counter, and the index counter is coupled to the index unit and configured to sequentially generate the count values.

In an embodiment of the present invention, the index unit is a content addressable memory.

In an embodiment of the present invention, the storage operation unit is a computing-in-memory architecture.

In an embodiment of the present invention, each of the accumulation results generated by the storage operation unit is the total number of the corresponding logic "1".

In an embodiment of the present invention, the multiplier-accumulate module includes a multiplier and an accumulator. The multiplier is coupled to the redundant to 2's complement converter and the mapping table. The multiplier is configured to receive and multiply the total data value and the coefficient that correspond to each of the count values, thereby generating product values. The accumulator is coupled to the multiplier and configured to receive and accumulate the product values, thereby generating the inner product value.

In an embodiment of the present invention, the accumulator is further coupled to a function processor, and the function processor is configured to perform an activation function, a rounding function, and a saturation function on the inner product value.

In an embodiment of the present invention, the device for computing an inner product further includes another index unit and another storage operation unit for performing a ping-pong mode operation.

In an embodiment of the present invention, the count value is equal to a corresponding the index value.

In an embodiment of the present invention, the inner product value is applied to a neural network, a filter, or a related computation.

To sum up, the device for computing an inner product not only uses the index value in order to greatly reduce the computation amount, but also uses the parallel accumulation capability of the storage operation unit to balance the computation amount and have the high usage of the hardware architecture, thereby achieving high efficiency and lower power consumption.

Below, the embodiments are described in detail in cooperation with the drawings to make easily understood the technical contents, characteristics and accomplishments of the present invention.

DETAILED DESCRIPTION OF THE INVENTION

Figure 1:
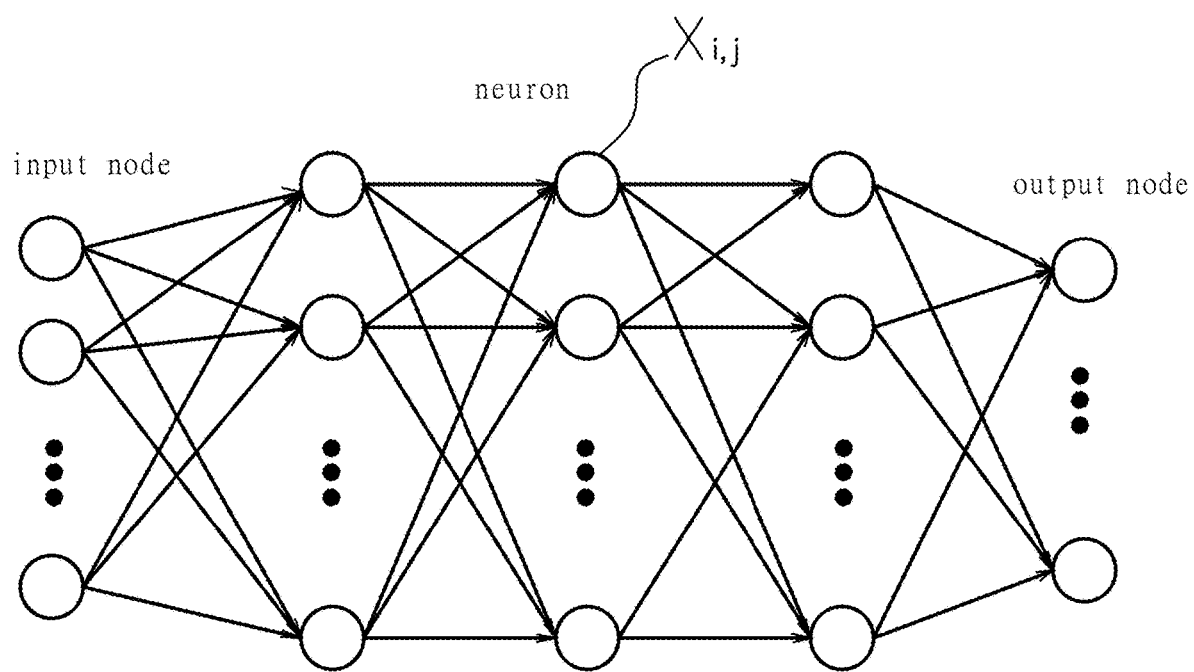
FIG. 1 is a schematic diagram illustrating a fully-connected neural network in the conventional technology.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/ without other intermediate devices or connection means.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Figure 4:
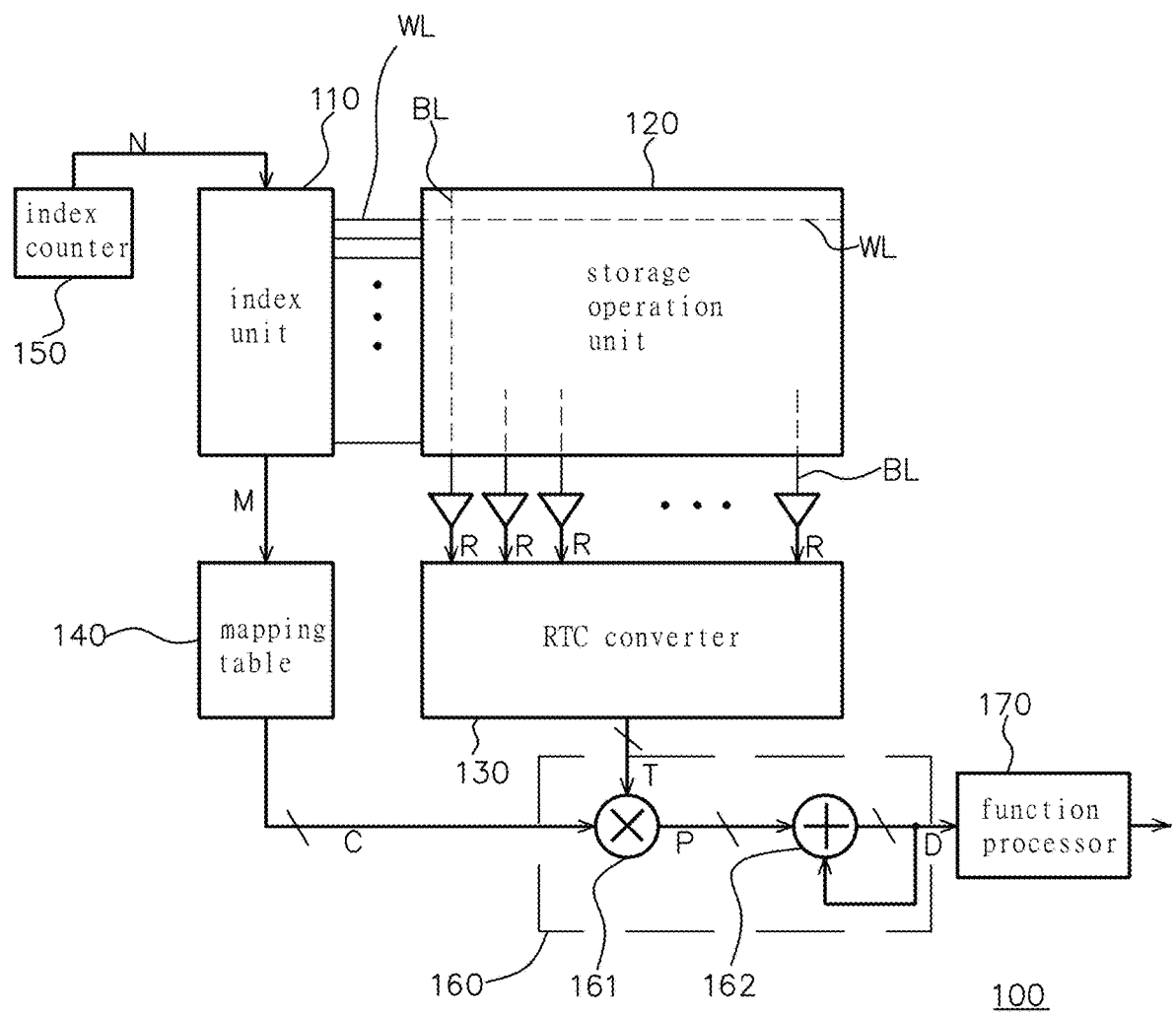
FIG. 4 is a schematic diagram illustrating a device for computing an inner product according to an embodiment of the present invention.

FIG. 4 is a schematic diagram illustrating a device for computing an inner product according to an embodiment of the present invention. Referring to FIG. 4, the device for computing an inner product 100 includes an index unit 110, a storage operation unit 120, a redundant to 2's complement (RTC) converter 130, a mapping table 140, an index counter 150, and a multiplier-accumulate (MAC) module 160. The index unit 110 may be a content addressable memory. The storage operation unit 120 may be a computing-in-memory architecture. The computing-in-memory architecture includes memories and operation circuits. For example, the storage operation unit 120 may be an 8T SRAM (e.g., referring to ISSCC 2019/SESSION 24/SRAM & COMPUTATION-IN-MEMORY/24.5 "A Twin-8T SRAM Computation-In-Memory Macro for Multiple-Bit CNN-Based Machine Learning"). The index counter 150 sequentially generates count values N. The index unit 110 stores index values. The index unit 110 is coupled to the index counter 150 and word lines WL arranged in parallel. All the word lines WL respectively correspond to all the index values. The index unit 110 sequentially receives all the count values N and uses the index value corresponding to each of the count values N as a mapping value M. The index unit 110 sequentially sends out the mapping value M corresponding to each of the count values N and enables the word line WL corresponding to the mapping value M. For example, the count value N is equal to the corresponding index value. The storage operation unit 120 includes memory cells, all the word lines WL, and bit lines BL arranged in parallel. All the word lines WL may be perpendicular to all the bit lines BL. Each word line WL is coupled to all the bit lines BL through the memory cells. All the memory cells respectively store data values, wherein the data value includes logic "1" or logic "0". The storage operation unit 120 accumulates the data values corresponding to all the bit lines BL and the enabled word line WL, thereby generating accumulation results R that respectively correspond to all the bit lines BL. For example, each of the accumulation results R generated by the storage operation unit 120 is the total number of the corresponding logic "1".

The redundant to 2's complement (RTC) converter 130 is coupled to the storage operation unit 120. The RTC converter 130 may include an adder. In some embodiment, the RTC converter 130 may further include a redundant to 2's complement (RTC) conversion circuit coupled to the adder. The RTC converter 130 receives, shifts, and adds all the accumulation results R to convert the accumulation results R into a total data value T in 2's complement format. The mapping table 140 is coupled to the index unit 110. The mapping table 140 stores coefficients C corresponding to all the index values. The mapping table 140 receives the mapping value M and sends out the coefficient C corresponding to the mapping value M. The MAC module 160 is coupled to the redundant to 2's complement converter 130 and the mapping table 140. The MAC module 160 receives the total data value T and the coefficient C that correspond to each of the count values N. The MAC module 160 perform multiplication and accumulation on the total data value T and the coefficient C that correspond to each of the count values N based on the distributive law, thereby generating an inner product value D.

In an embodiment of the present invention, the MAC module 160 may include a multiplier 161 and an accumulator 162. The multiplier 161 is coupled to the redundant to 2's complement converter 130 and the mapping table 140. The multiplier 161 receives and multiplies the total data value T and the coefficient C that correspond to each of the count values N, thereby generating product values P. The accumulator 162 is coupled to the multiplier 161. The accumulator 162 receives and accumulates the product values P, thereby generating the inner product value D.

The operation of the device for computing an inner product is introduced as follows. For example, the count values N include a first count value N1 and a second count value N2. The mapping value M may be a first mapping value M1 or a second mapping value M2. All the word lines WL include a first word line and a second word line. The accumulation results R may be first accumulation results R1 or second accumulation results R2. The total data value T may be a first total data value T1 or a second total data value T2. The coefficients C include a first coefficient C1 and a second coefficient C2. The product values P include a first product value P1 and a second product value P2.

The index counter 150 sequentially generates the first count value N1 and the second count value N2. The index unit 110 sequentially receives the first count value N1 and the second count value N2 and respectively uses the index values corresponding to the first count value N1 and the second count value N2 as the first mapping value M1 and the second mapping value M2. The index unit 110 sequentially sends out the first mapping value M1 and the second mapping value M2 and enables the word lines corresponding to the first mapping value M1 and the second mapping value M2. For example, the index unit 110 enables the first word line corresponding to the first mapping value M1 when the index unit 110 sends out the first mapping value M1. The index unit 110 enables the second word line corresponding to the second mapping value M2 when the index unit 110 sends out the second mapping value M2. The storage operation unit 120 accumulates the data values corresponding to all the bit lines BL and the enabled first word line, thereby generating the first accumulation results R1 that respectively correspond to all the bit lines BL. Similarly, the storage operation unit 120 accumulates the data values corresponding to all the bit lines BL and the enabled second word line, thereby generating the second accumulation results R2 that respectively correspond to all the bit lines BL. The RTC converter 130 receives all the first accumulation results R1 and converts the first accumulation results R1 into a first total data value R1 in 2's complement format. The RTC converter 130 receives all the second accumulation results R2 and converts the second accumulation results R2 into a second total data value T2 in 2's complement format. The mapping table 140 receives the first mapping value M1 and sends out the first coefficient C1 corresponding to the first mapping value M1. The mapping table 140 receives the second mapping value M2 and sends out the second coefficient C2 corresponding to the second mapping value M2. The multiplier 161 receive and multiplies the first total data value R1 and the first coefficient C1 to generate the first product value P1. The multiplier 161 receive and multiplies the second total data value T2 and the second coefficient C2 to generate the second product value P2. Finally, the accumulator 162 accumulates the first product value P1 and the second product value P2 to generate the inner product value D. The device for computing an inner product of the present invention not only uses the index value in order to greatly reduce the computation amount, but also uses the parallel accumulation capability of the storage operation unit 120 to balance and simplify the computation amount, thereby achieving the high usage and low power consumption of the hardware architecture.

In an embodiment of the present invention, the inner product value D can be applied to a neural network. The accumulator 162 may be coupled to a function processor 170. The function processor 170 performs an activation function, a rounding function, and a saturation function on the inner product value D. For example, the activation function may be a rectified linear unit (ReLU) function, but the present invention is not limited thereto. In another embodiment, the inner product value D is alternatively applied to a filter, a related computation, or the like.

Figure 5:
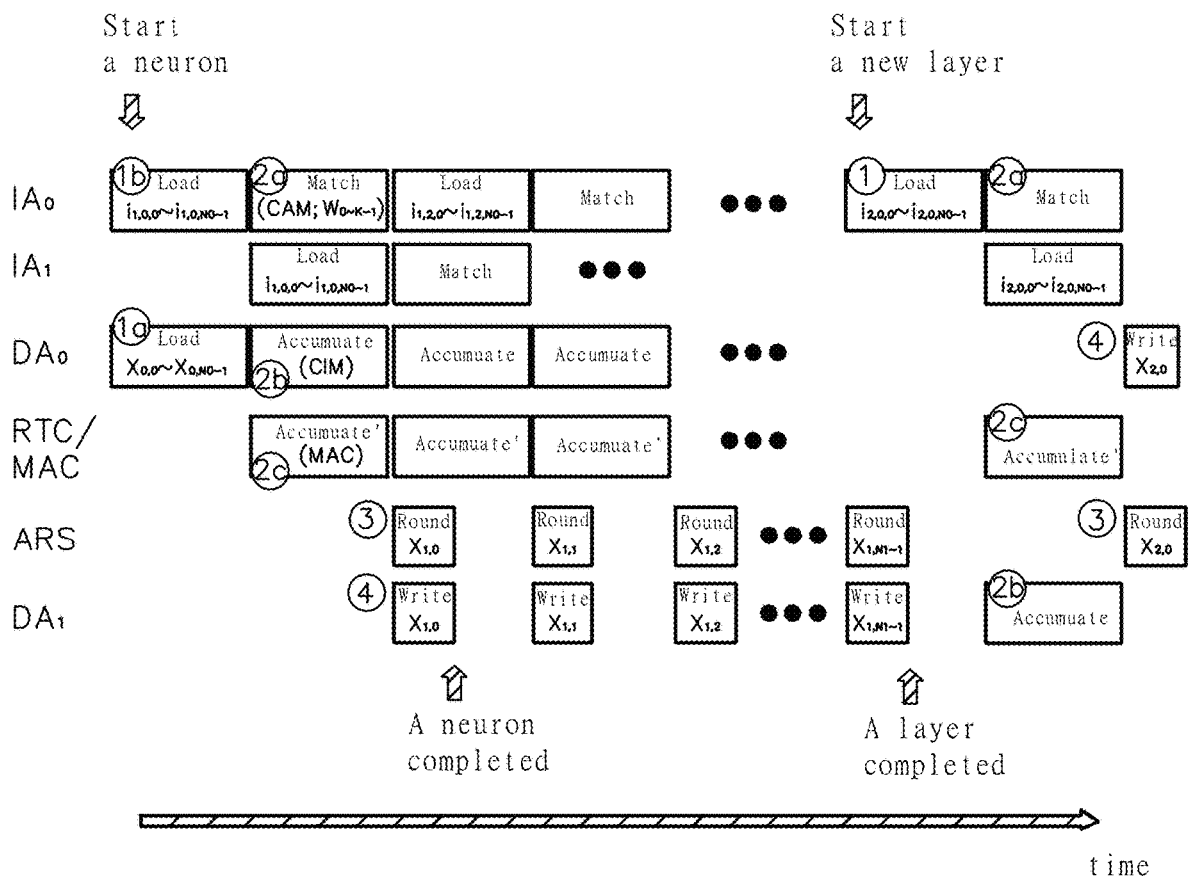
FIG. 5 is a diagram illustrating a timing sequence of a device for computing an inner product applied to a neural network according to an embodiment of the present invention.

In addition, the output data of neurons of a layer of the neural network will be used as the input data of neurons of a next layer such that the roles of neurons of neighboring layers exchange. As a result, the device for computing an inner product 100 may further include another index unit and another storage operation unit, wherein the index unit and the storage operation unit are respectively the same to the index unit 110 and the storage operation unit 120. The index unit and the storage operation unit are also used to store index values and data values. The two index units cooperate with the two storage operation units to perform a ping-pong mode operation. FIG. 5 is a diagram illustrating a timing sequence of a device for computing an inner product applied to a neural network according to an embodiment of the present invention. In cooperation with FIG. 5, the ping-pong mode operation of the neural network and the inner product computation are explained as follows. Referring to FIG. 4 and FIG. 5, $IA_0$ and $IA_1$ respectively represent two index units 110. $DA_0$ and $DA_1$ respectively represent two storage operation units 120. RTC and MAC respectively represent the RTC converter 130 and the MAC module 160. ARS represents the function processor 170. The steps are detailed as follows:

Step 1: The data value and the index value are respectively implemented with a data vector and an index vector. The data vector and the index vector are respectively stored in a storage operation unit $DA_0$ and an index unit $IA_0$, as illustrated in timing sequences 1a and 1b.

Step 2: The index counter 150 counts from 0 to K−1, wherein K represents the number of coefficients. Using the content addressable memory, the index value of the index unit $IA_0$ equal to the count value generated by the index counter 150 is searched out, as illustrated in a timing sequence 2a. Simultaneously, the computing-in-memory technology can directly accumulate the data values of the storage operation unit $DA_0$ corresponding to the searched index value and directly read the number of logic "1" from the memory cells connected to all bit lines BL of the storage operation unit $DA_0$. Then, the RTC converter 130 converts the read values of the multi-valued bit-lines BL into a total data value in 2's complement format, as illustrated in a timing sequence 2b. Finally, the multiplier 161 multiplies the same coefficient by the corresponding total data value based on the distributive law to obtain a product value. The adder 162 accumulates all the product values to obtain an inner product of vectors, as illustrated in a timing sequence 2c. It is worthy mentioned that the order of redundant to 2's complement (RTC) conversion and subsequent multiplication is adaptable based on the lengths of required data. The embodiments described above are only to exemplify the present invention but not to limit the scope of the present invention.

The inner product computation is completed after the abovementioned steps. When the inner product computation is applied to the neural network, the following steps need to be performed:

Step 3: The inner product of vectors is inputted into the function processor 170 to perform an activation function, a rounding function, and a saturation function. The activation function may be a ReLU function. For ReLU function, 0 is outputted when the computation result is negative, and the original value is outputted when the computation result is positive. For the saturation function, the maximum value is used as the computation result when the computation result exceeds the maximum value. For the rounding function, the computation result is normalized into the original data representation after the unimportant mantissas of the computation result are removed, as illustrated in a timing sequence 3.

Step 4: The normalized computation result of the neuron is written into the storage operation unit $DA_1$, as illustrated in a timing sequence 4. In order to improve usage of the architecture and make the computation of neurons smooth, the index units $IA_0$ and $IA_1$ and the storage operation units $DA_0$ and $DA_1$ perform the ping-pong mode operation, such that multiple neurons simultaneously perform operations in a pipelined way. From FIG. 5, it is observed that the embodiment removes the unnecessary multiplication operation based on the distributive law and smoothly operates in order to easily achieve high usage of the hardware architecture.

In order to emphasize the difference between the present invention and the conventional technology, Table 1 takes a fully-connected deep neural network (FC_DNN) as an example and shows the comparison of the computation amount and the memory access.

TABLE 1

Comparison of the computation amount and the memory access (FC_DNN)

Figure 2:
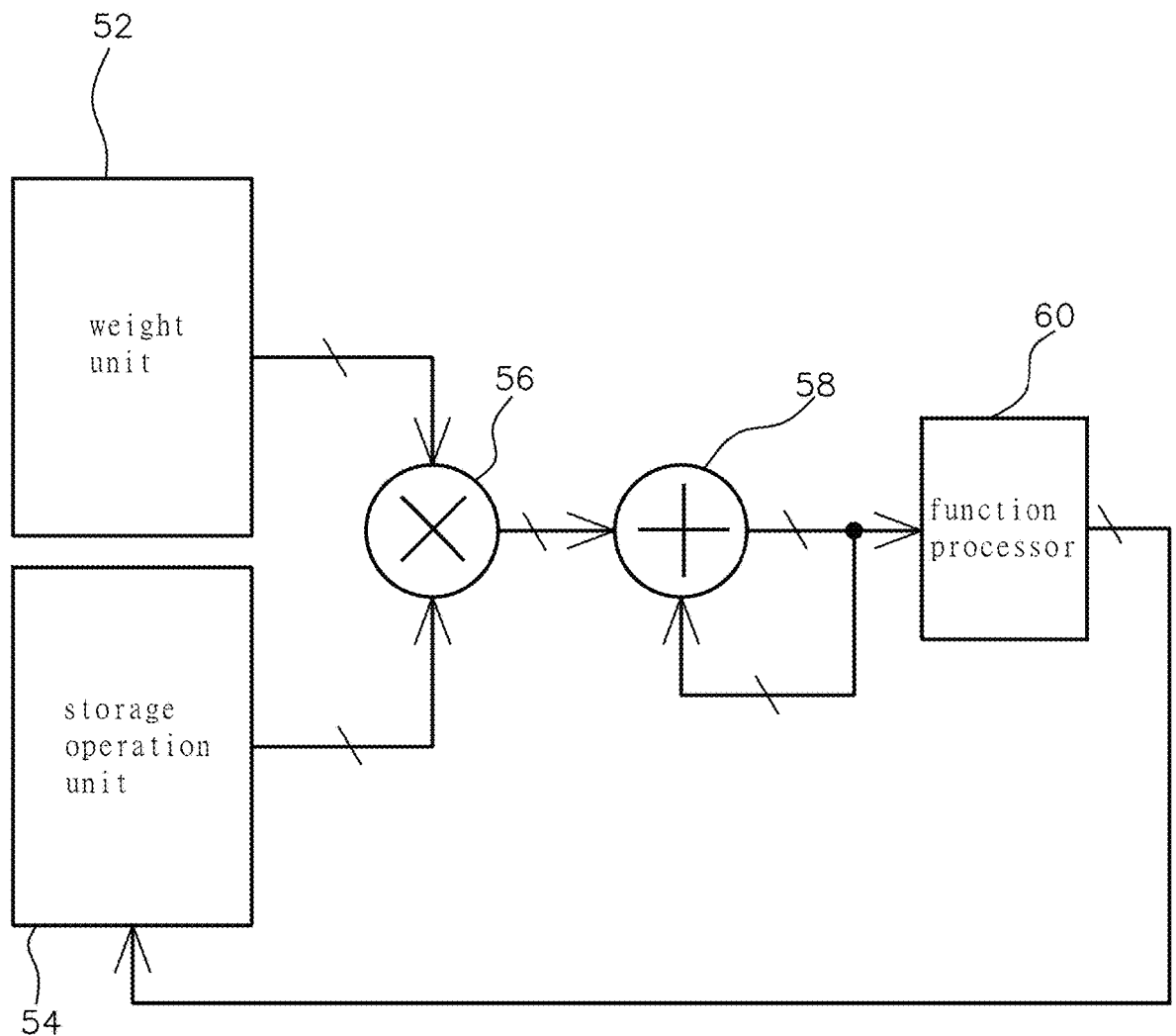
FIG. 2 is a schematic diagram illustrating a device for computing an inner product applied to the neural network in the conventional technology.
Figure 3:
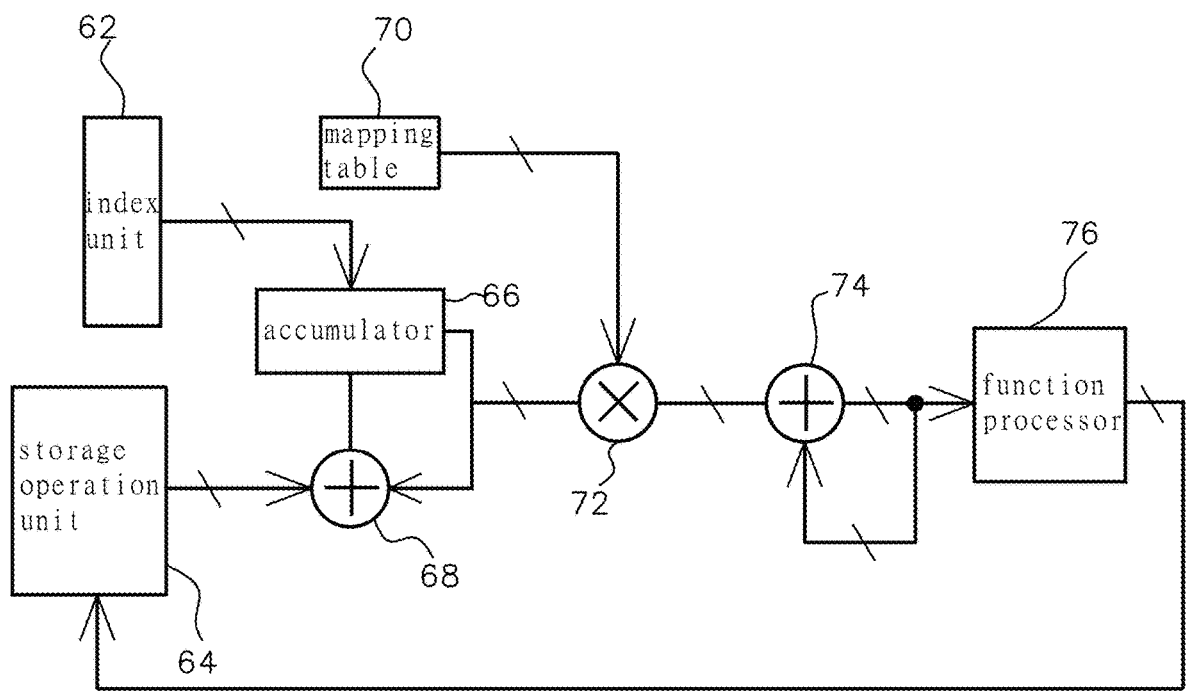
FIG. 3 is a schematic diagram illustrating a device for computing an inner product in the conventional technology.

| Conventional architecture in FIG. 2 | Architecture of the present invention in FIG. 3 | Ratio |
| --- | --- | --- |
| 199168 16-bit weight memory reads | 199168 4-bit index memory reads 199168 4-bit index unit writes | 4:1 |
| 199168 16-bit weight units writes | | |
| 199168 16-bit weight unit reads | 11670 index unit matches | 17:1 |
| 199168 16-bit storage operation unit reads | 11670 storage operation unit's accumulations & RTC | |
| 199168 16-bit × 16-bit multiplications | 11670 24-bit × 16-bit multiplications | |
| 199168 40-bit accumulations | 11670 40-bit accumulations | |
| 778 ARS operations | 778 ARS operations | unchanged |
| 778 16-bit weight unit writes | 778 16-bit storage operation unit writes | |

From Table 1, it is apparently observed that the memory capacity of the present invention is ¼ of the memory capacity of the conventional technology. Besides, the computation amount of the present invention is 1/17 of the computation amount of the conventional technology. Accordingly, the device for computing an inner product of the present invention effectively reduces the required memories and the computation amount.

According to the embodiments provided above, the device for computing an inner product not only uses the index value in order to greatly reduce the computation amount, but also uses the parallel accumulation capability of the storage operation unit to balance the computation amount and have the high usage of the hardware architecture, thereby achieving high efficiency and lower power consumption.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A device for computing an inner product comprising:
an index unit configured to store index values and coupled to word lines arranged in parallel, wherein the word lines respectively correspond to the index values, the index unit is configured to sequentially receive count values, use the index value corresponding to each of the count values as a mapping value, sequentially send out the mapping value corresponding to each of the count values, and enable the word line corresponding to the mapping value;

a storage operation unit comprising memory cells, the word lines, and bit lines arranged in parallel, wherein each of the word lines is coupled to the bit lines through the memory cells, the memory cells are configured to respectively store data values, the data value comprises logic "1" or logic "0", and the storage operation unit is configured to accumulate the data values corresponding to the bit lines and an enabled the word line, thereby generating accumulation results that respectively correspond to the bit lines;

a redundant to 2's complement (RTC) converter coupled to the storage operation unit and configured to receive, shift and add the accumulation results to convert the accumulation results into a total data value in 2's complement format;

a mapping table coupled to the index unit, wherein the mapping table is configured to store coefficients corresponding to the index values, receive the mapping value, and send out the coefficient corresponding to the mapping value; and a multiplier-accumulate (MAC) module coupled to the redundant to 2's complement converter and the mapping table, wherein the multiplier-accumulator module is configured to receive the total data value and the coefficient that correspond to each of the count values, and the multiplier-accumulator module is configured to perform multiplication and accumulation on the total data value and the coefficient that correspond to each of the count values based on a distributive law, thereby generating an inner product value.

2. The device for computing an inner product according to claim 1, further comprising an index counter, and the index counter is coupled to the index unit and configured to sequentially generate the count values.

3. The device for computing an inner product according to claim 1, wherein the index unit is a content addressable memory.

4. The device for computing an inner product according to claim 1, wherein the storage operation unit is a computing-in-memory architecture.

5. The device for computing an inner product according to claim 1, wherein each of the accumulation results generated by the storage operation unit is total number of a corresponding the logic "1".

6. The device for computing an inner product according to claim 1, wherein the multiplier-accumulate module includes:
a multiplier coupled to the redundant to 2's complement converter and the mapping table, wherein the multiplier is configured to receive and multiply the total data value and the coefficient that correspond to each of the count values, thereby generating product values; and
an accumulator coupled to the multiplier and configured to receive and accumulate the product values, thereby generating the inner product value.

7. The device for computing an inner product according to claim 6, wherein the accumulator is further coupled to a function processor, and the function processor is configured to perform an activation function, a rounding function, and a saturation function on the inner product value.

8. The device for computing an inner product according to claim 7, further comprising another index unit and another storage operation unit for performing a ping-pong mode operation.

9. The device for computing an inner product according to claim 1, wherein the count value is equal to a corresponding the index value.

10. The device for computing an inner product according to claim 1, wherein the inner product value is applied to a neural network, a filter, or a related computation.

* * * * *